US010922180B2

(12) United States Patent
Salgaonkar et al.

(10) Patent No.: US 10,922,180 B2
(45) Date of Patent: Feb. 16, 2021

(54) HANDLING UNCORRECTED MEMORY ERRORS INSIDE A KERNEL TEXT SECTION THROUGH INSTRUCTION BLOCK EMULATION

(71) Applicant: International Business Machines Corporation, Armonk, NY (US)

(72) Inventors: Mahesh J. Salgaonkar, Bangalore (IN); Anshuman Khandual, Bangalore (IN); Srikar Dronamraju, Bangalore (IN); Haren Myneni, Tigard, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

(21) Appl. No.: 16/150,568

(22) Filed: Oct. 3, 2018

(65) Prior Publication Data

US 2020/0110665 A1 Apr. 9, 2020

(51) Int. Cl.
*G06F 11/00* (2006.01)
*G06F 11/14* (2006.01)
*G06F 9/54* (2006.01)
*G06F 9/455* (2018.01)
(Continued)

(52) U.S. Cl.
CPC .......... *G06F 11/1405* (2013.01); *G06F 9/455* (2013.01); *G06F 9/545* (2013.01); *G06F 11/079* (2013.01); *G06F 11/1446* (2013.01); *G06F 11/2084* (2013.01)

(58) Field of Classification Search
CPC .............. G06F 11/1405; G06F 11/079; G06F 11/1482; G06F 11/2084
See application file for complete search history.

(56) References Cited

U.S. PATENT DOCUMENTS 7,302,619 B1 * 11/2007 Tompkins ........... G06F 11/1064
712/231
8,924,782 B2 * 12/2014 Locasto .............. G06F 11/3672
714/15

(Continued)

FOREIGN PATENT DOCUMENTS

WO WO2018009296 1/2018

OTHER PUBLICATIONS

L. Cui, "Demonstrating the Memory RAS Features of Lenovo ThinkSystem Servers", Lenovo Press, Oct. 31, 2017, pp. 1-25.

*Primary Examiner* — Philip Guyton
(74) *Attorney, Agent, or Firm* — Noah Sharkan, Esq.; Kevin P. Radigan, Esq.; Heslin Rothenberg Farley & Mesiti P.C.

(57) ABSTRACT

A technique for handling uncorrected memory errors (UEs) inside a kernel text section, the kernel text section being stored in a memory that is operably coupled to a CPU executing kernel program instructions. In an embodiment, a UE is detected that affects the kernel text section. The current instruction affected by the UE is identified. The UE-affected instruction is recovered by loading a copy thereof into the memory from a kernel image maintained in persistent storage. The UE-affected instruction is emulated using the copy of the UE-affected instruction. The instruction pointer of the CPU is then incremented to point to a next instruction in the memory that would normally be executed by the UE-affected instruction had there been no UE.

20 Claims, 3 Drawing Sheets

(51) Int. Cl.
*G06F 11/07* (2006.01)
*G06F 11/20* (2006.01)

(56) References Cited

U.S. PATENT DOCUMENTS

| | | |
|---|---|---|
| 2013/0007507 A1* | 1/2013 | Raj .................... G06F 11/0724 714/5.11 |
| 2014/0096250 A1 | 4/2014 | Belov |
| 2016/0077939 A1 | 3/2016 | Prasad |
| 2016/0266946 A1 | 9/2016 | Adda et al. |

* cited by examiner

HANDLING UNCORRECTED MEMORY ERRORS INSIDE A KERNEL TEXT SECTION THROUGH INSTRUCTION BLOCK EMULATION

BACKGROUND

1. Field

The present disclosure relates to memory error handling in computer systems. More particularly, the disclosure concerns handling unrecoverable memory errors inside a kernel text section.

2. Description of the Prior Art

By way of background, memory errors are a common form of hardware failure in modern computer systems. A memory error is an event that leads to the corruption of one or more bits in the computer system memory. Memory errors can be caused by electrical or magnetic interference, can be due to problems with hardware (e.g. a bit being permanently damaged), or due to corruption along the data path between memory modules and processing elements such as CPUs, memory controllers, memory buffers, etc. Advancements in memory technology that allow memory modules to be more densely packed makes them more vulnerable to memory errors as well.

Most enterprise computer systems employ different mechanisms to recover from memory errors. The recovery mechanisms can be implemented at the hardware or software level. At the hardware level, Error Correcting Codes (ECC) are used to recover form single bit errors. Other techniques are used to recover from multi-bit errors. However, hardware cannot recover from all kinds of memory errors. For example, hardware cannot recover from memory errors if the number of affected bits exceeds the ECC correctable limit. Memory errors that are automatically detected and corrected by hardware are categorized as Corrected Errors (CE). Memory errors that are detected by hardware but cannot be corrected are categorized as Uncorrected Errors (UE).

UEs are typically reported to software (e.g., a host operating system or a hypervisor) through a non-maskable machine check interrupt (MCI), also known as a machine check exception (MCE), thereby giving the software an opportunity to handle and recover from the UEs. The software may employ different methods to recover from UEs, depending on the affected memory location(s).

Some UEs can be recovered at the software level, but not all. The impact on system operation of not being able to recover from a UE depends on the nature of the affected memory location(s). For example, if a non-recoverable UE occurs in userspace memory, the operating system can terminate the process and continue, causing service disruption to only one application service. On the other hand, if a non-recoverable UE occurs in an operating system or hypervisor kernel text section, the kernel panics and the system crashes. In the case of an operating system kernel text section, the kernel panic and system crash causes disruption to all user application services running under the OS. In the case of a hypervisor kernel text section, the impact of service disruption is multi-fold because it brings down every virtual machine running under the hypervisor.

It is to improvements in the handling of UEs inside a kernel text section that the present disclosure is directed.

SUMMARY

A method, system and computer program product are provided for handling uncorrected memory errors (UEs) inside a kernel text section, the kernel text section being stored in a memory that is operably coupled to a CPU executing kernel program instructions. In an embodiment, a UE is detected that affects the kernel text section. The current instruction affected by the UE is identified. The UE-affected instruction is recovered by loading a copy thereof into the memory from a kernel image maintained in persistent storage. The UE-affected instruction is emulated using the copy thereof. The instruction pointer of the CPU is then incremented to point to a next instruction in the memory that would normally be executed by the UE-affected instruction had there been no UE.

BRIEF DESCRIPTION OF THE DRAWINGS

The foregoing and other features and advantages will be apparent from the following more particular description of example embodiments, as illustrated in the accompanying Drawings.

DETAILED DESCRIPTION

The present disclosure proposes a technique to handle and recover from uncorrected errors (UEs) that occur in a kernel text section of a computer system memory. As used herein, a "kernel" includes an operating system, a hypervisor (a.k.a. virtual machine manager), or other supervisory software that runs in the highest privilege mode of a CPU relative to other software running on the same computer system. As used herein, a "memory" is a set of one or more integrated circuit devices (usually organized as memory modules) having addressable semiconductor storage locations where instructions and data are maintained when a CPU is actively using them during computer software program execution. A "memory" is sometimes referred to as "primary storage," and is to be distinguished from "persistent" storage, which is where computer programs and data are stored permanently between system reboots, and is sometimes referred to as "secondary storage." As used herein, an "uncorrected memory error" or "UE" refers to a memory error that is detected but not corrected by computer system hardware. UEs are typically reported to computer system software through a machine check interrupt (MCI). A kernel MCI handler (a.k.a. machine check handler) may then attempt to recover from the UE if it is possible to do so. As noted in the "Background" section above, not all UEs can be corrected at the software level, and this can result in kernel panic if the UE is in the kernel text section of the system memory.

Figure 1:
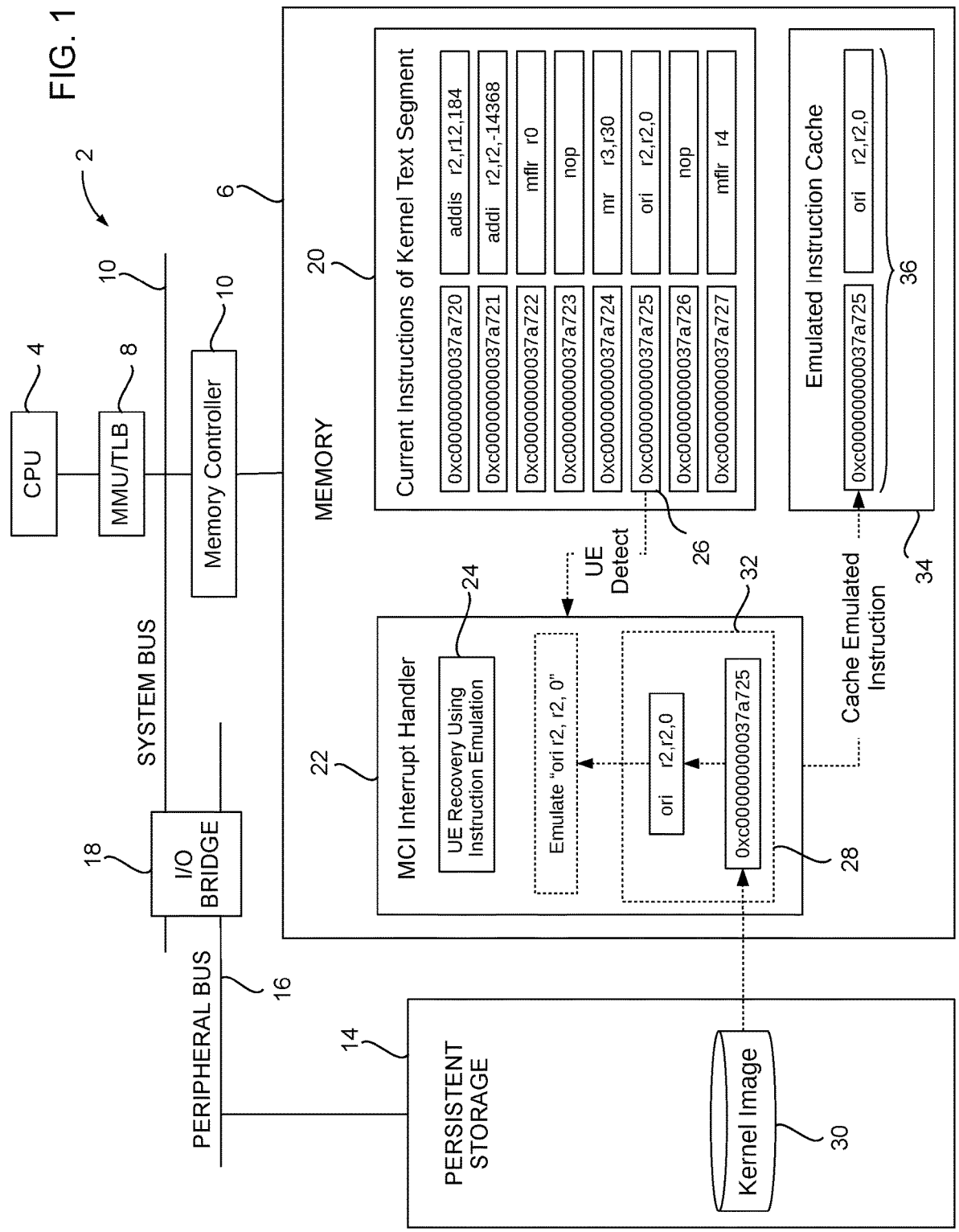
FIG. 1 is a functional block diagram showing an example computer system operable to handle UEs in a kernel text section.

Turning now to the drawing figures, wherein like reference numerals represent like elements in all of the several views, FIG. 1 illustrates an example computer system 2 that may be used to implement the disclosed technique for handling and recovering from UEs that occur in a kernel text section. The computer system 2 may represent any of several different types of computing apparatus. Such computing apparatus may include, but are not limited to, general purpose computers, special purpose computers, portable computing devices, portable computing-communication devices (such as smartphones), media player devices, set-top devices, embedded systems, and many other types of information handling machines.

According to one possible embodiment, the computer system 2 may include at least one CPU 4 that operates in conjunction with a memory 6. As used herein, the term "CPU" includes, but is not necessarily limited to, any single-threaded or multi-threaded program execution unit within a single-core or multi-core packaged integrated circuit device (each core being considered a CPU) that is designed to execute program instruction logic, such as software or firmware. The CPU 4 may be implemented using any applicable instruction set architecture, including but not limited to CISC, RISC or otherwise.

The memory 6 may implemented using RAM (Random Access Memory), ROM (Read-Only Memory), combinations of RAM and ROM, or any other type of tangible storage medium capable of holding digital instructions and data in computer-readable form for use by the CPU 4 during software execution. The CPU 4 and the memory 6 may be situated within a single computing node (e.g., as part of a single-node SMP system) or they may be instances of plural CPUs and memory distributed over plural nodes (e.g., as part of a NUMA system or cluster). Other distributed topologies could also be employed.

Disposed between the CPU 4 and the memory 6 are an MMU/TLB 8 (memory management unit/translation lookaside buffer), a system bus 10, and a memory controller 12. As is conventional, the memory controller 12 may be integrated with the CPU 4 as part of a single physical processor package, or it may be off-chip (e.g. in a separate memory controller package). The CPU 4 additionally communicates with a persistent storage device 14, which may be implemented as a disk drive, a flash memory (e.g., a solid state drive (SSD)), or any other peripheral device capable of persistently storing software instructions and data in digital computer readable form between reboots of the computer system 2. The persistent storage device 14 may be connected to a peripheral bus 16 that may communicate with the system bus 10 via an I/O bridge 18.

Although not shown, the peripheral bus 16 may connect to various additional peripheral devices, including but not limited to a display adapter, a keyboard or keypad input device, a pointer input device, a network interface card (NIC), a USB bus controller, a SCSI disk controller, etc. Any suitable bus or other communication infrastructure may be used to interconnect the foregoing elements. It should be understood that the foregoing description is for purposes of illustration only, and that other components and component arrangements could be used to implement the internals of the computer system 2.

The memory 6 stores various functional components of an operating system or hypervisor (virtual machine manager) kernel. In the illustrated embodiment, these kernel components include a set of software instructions 20 representing a currently executing kernel code path of a kernel text segment (also known as a code segment). The kernel components within the memory 6 further include an MCI interrupt handler 22 that executes in interrupt context in response to an MCI. The MCI interrupt handler 22 implements UE recovery functionality for handling and recovering from UEs affecting one or more memory address locations that hold the kernel text segment instructions 20. This UE recovery functionality is represented by reference number 24 in FIG. 1.

With additional reference to FIG. 2, example operations that may be performed by the UE recovery functionality 24 to implement an embodiment of the disclosed technique will now be described. In block 22-2, a UE affecting a current kernel text section instruction 20 is detected due to an MCI. In an embodiment, a machine check interrupt is raised by the computer system's memory subsystem hardware (such as the memory controller 12). In block 22-4, the current instruction affected by the UE is identified. In FIG. 1, the UE-affected instruction is designated by reference number 26. For purposes of example only, the UE-affected instruction 26 is a RISC OR-Immediate instruction "ori r2,r2,0" stored at memory address 0xc00000000037a725 in the memory 6. Block 22-4 may identify the UE-affected instruction 26 using existing MCI functionality whereby the faulted address of a detected UE is stored in one of the CPU 4's registers when the MCI is raised. In a RISC CPU architecture, this may be a special purpose register (SPR). As part of block 22-4, the MCI interrupt handler 22 may fetch and interpret the stored address of the UE-affected instruction 26 in response to the MCI.

In block 22-6, a copy 28 of the UE-affected instruction 26 is extracted from a kernel image 30 maintained in the persistent storage 14. In block 22-8, the instruction copy 28 is loaded into a different memory location 32 in the memory 6. These operations are illustrated in FIG. 1. Extracting the instruction copy 28 per block 22-6 may include using existing binary file helper mechanisms (e.g., helper functions for ELF (Executable Linkable Format) files) to correlate the memory address of the UE-affected instruction 26 with a corresponding file offset within the kernel image file 30. Loading the instruction copy 28 into the memory location 32 per block 22-8 may include the UE recovery functionality 24 dynamically-allocating a kernel memory region using an existing dynamic memory-allocation mechanism (e.g., such as vmalloc( ) in a Linux® implementation).

In block 22-10, the instruction copy 28 is emulated by the UE recovery functionality 24 to create the same effect that the original UE-affected instruction 26 would have had if there had been no UE at the instruction's original memory address. The UE recovery functionality 24 may use existing kernel mechanisms for emulating faulted instructions. For example, the existing Linux Kprobes mechanism emulates certain instructions that cannot be executed out-of-line (such as branch instructions). Following instruction emulation in block 22-10, block 22-12 increments the CPU's current instruction pointer to point to the appropriate instruction address in the original instruction stream. This will be the address of the next instruction that would normally follow execution of the UE-affected instruction 26. For the UE-affected instruction 26 in FIG. 1, the next instruction to be executed will be the "nop" (No Operation) instruction at memory address 0xc00000000037a726. If the UE-affected instruction 26 was a branch instruction, the current instruction pointer might well point to some other address.

Figure 2:
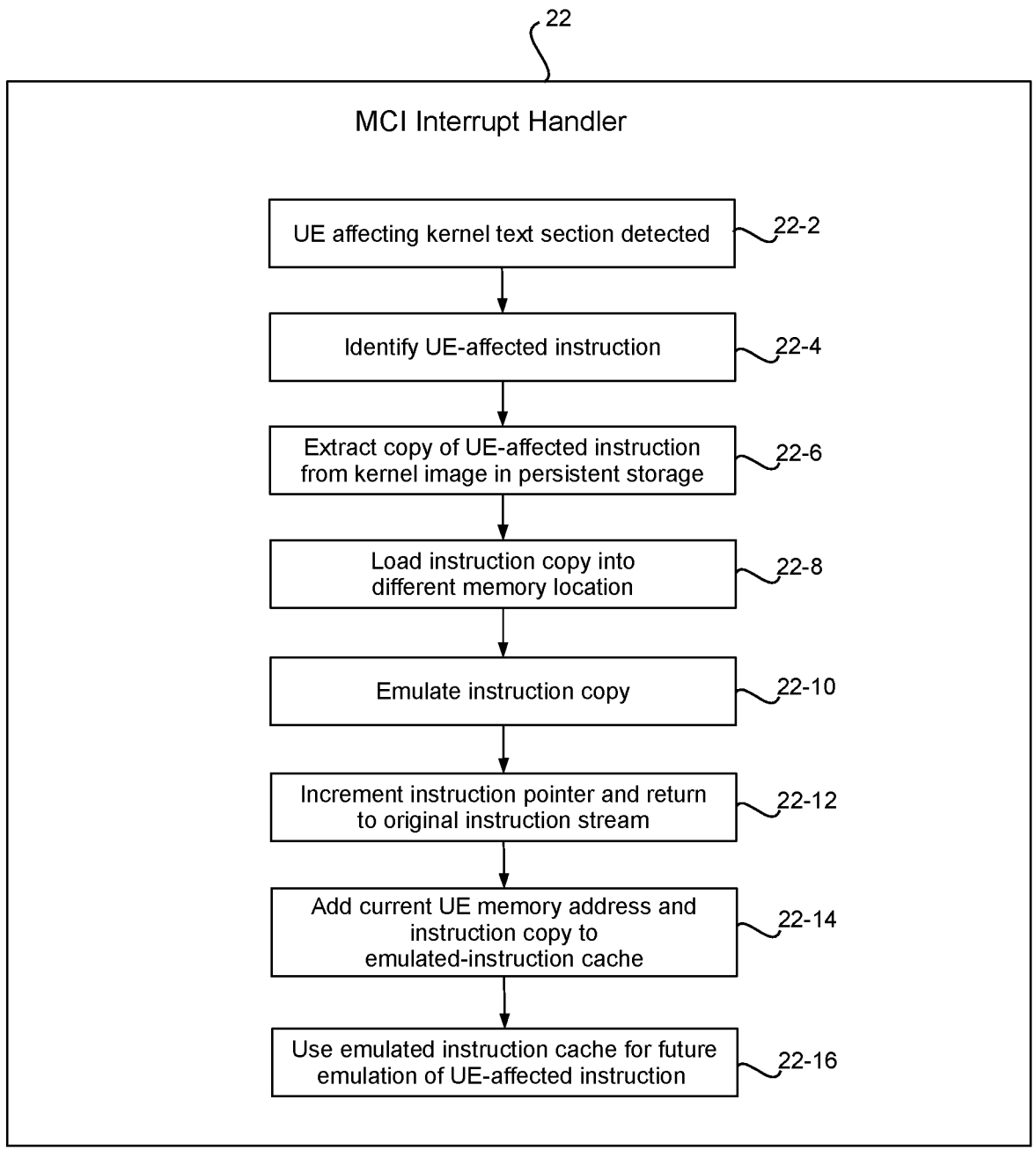
FIG. 2 is a flow diagram showing example operations for handling UEs in a kernel text section.

In an embodiment, the current UE memory address and the corresponding instruction fetched from the persistent storage 14 may be stored via block 2-14 of FIG. 2 as an address-instruction pair entry 36 in an in-memory table maintained in the memory 6. In FIG. 1, this table is denoted as an emulated instruction cache 34. Per block 22-16 of FIG. 2, the emulated instruction cache 34 may be used for future quick lookup and emulation of the UE-affected instruction 26 in response to a UE at the same memory address. In particular, the next time an MCI is raised due to the CPU 4 attempting to fetch the UE-affected instruction 26, the UE recovery functionality 24 may implement a modified version of block 22-6 of FIG. 2 that first attempts to find a copy of the UE-affected instruction in the emulated instruction cache 34 rather than extract a copy from the kernel image 30. If the corresponding address-instruction pair 36 is found, the UE recovery functionality will proceed to blocks 22-8 and 22-10 of FIG. 2 to emulate the UE-affected instruction 26 using the copy stored in the emulated instruction cache 34. In an embodiment, block 22-6 may always perform an initial check of the emulated instruction cache 34 in response to a UE affecting a kernel text section before attempting to extract a copy of the instruction from the kernel image. The UE recovery functionality 24 should only have to extract a kernel image copy of a given UE-affected instruction once. Thereafter, it will be possible to load a copy of the instruction from the emulated instruction cache 34. In an embodiment, the emulated instruction cache 34 may be saved to the persistent storage 14 for storage between reboots of the computer system 2.

Figure 3:
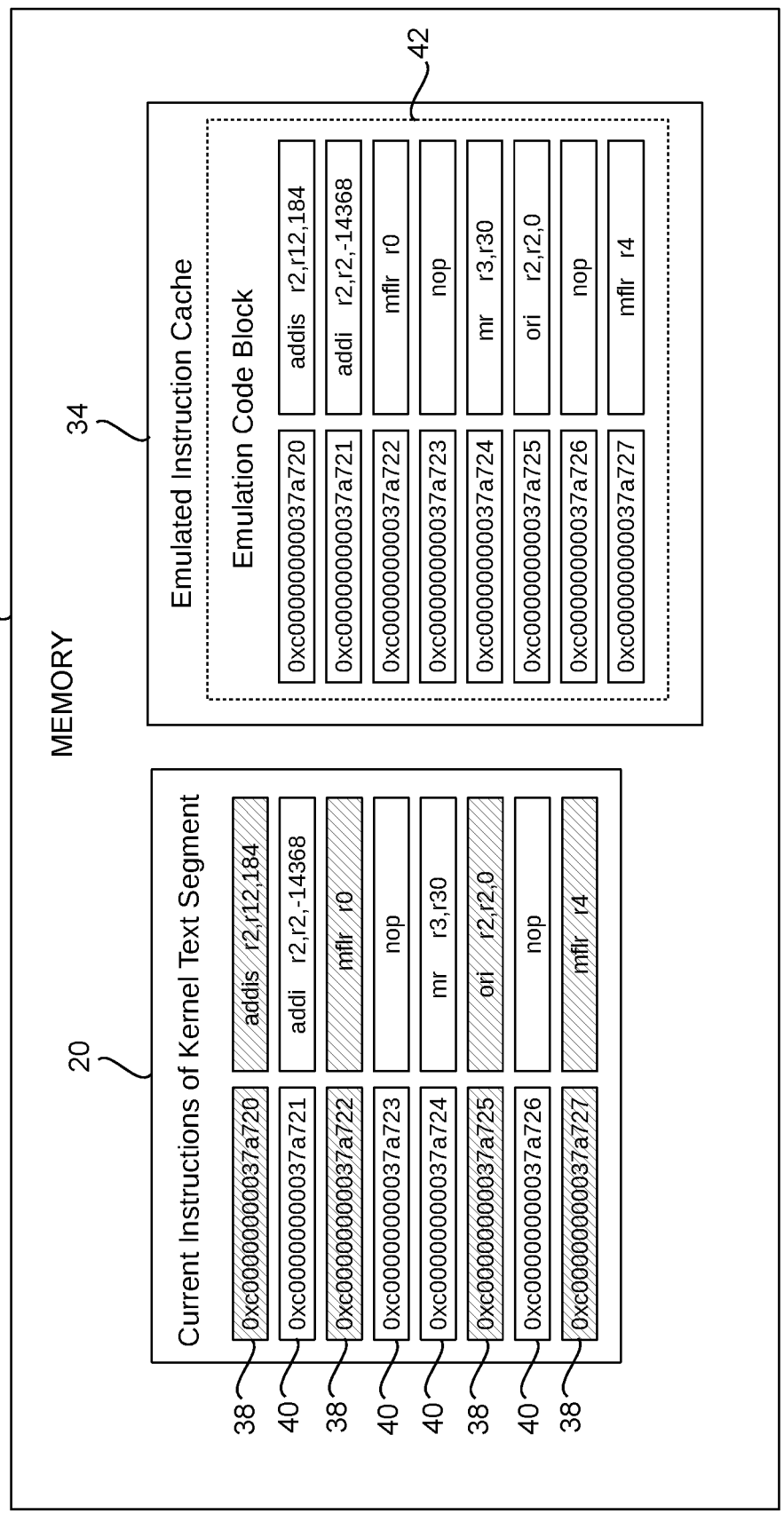
FIG. 3 is a functional block diagram illustrating use of an emulation code block to handle uncorrected UEs in a kernel text section.

Over the course of time, the UE recovery functionality 24 may handle and recover from multiple UEs occurring proximate to each other in the kernel text instruction 20 shown in FIG. 1. As shown in FIG. 3, there may be multiple closely placed UE-affected instructions 38 that are interspersed with unaffected (uncorrupted) instructions 40. FIG. 3 shows eight interspersed instructions spanning memory addresses 0xc00000000037a720-xc00000000037a727. In the illustrated example, four UE-affected instructions 38 occur at memory addresses 0xc00000000037a720, xc00000000037a722, 0xc00000000037a725 and xc00000000037a727, and four unaffected instructions 40 occur at memory addresses 0xc00000000037a721, xc00000000037a723, 0xc00000000037a724 and xc00000000037a726.

Instead of separately handling and recovering from each individual UE in this group of instructions, the UE recovery functionality 24 may create an emulation code block 42 in the emulated instruction cache 34 (or elsewhere). For the example above, the emulation code block 42 may include all of the UE-affected instructions 38 interspersed with all of the uncorrupted instructions 40. Thereafter, when the CPU 4 attempts to fetch the first UE instruction at memory address 0xc00000000037a720, the MCI handler 22 will check the emulated instruction cache 34 and discover that the UE instruction at memory address 0xc00000000037a720 is the first instruction of the emulation code block 42. The UE recovery functionality 24 may then emulate all of the instructions in the emulation code block 42 before returning to the original instruction stream. In this way, the kernel code may run relatively uninterrupted by reducing UE handling and recovery overhead, thereby improving the performance and reliability of kernel code blocks affected by multiple UEs.

The UE recovery functionality 24 may create emulation code blocks 42 whenever it discovers a set of address-instruction pair entries 36 whose addresses are relatively close to each other, such that there is justification for extracting intervening address-instruction pairs from the kernel image 30 for instructions that are unaffected by UEs. For example, assume there has been a fresh occurrence of a UE affecting a kernel text section that results in a new address-instruction pair 36 for the new UE-affected instruction being added to the emulated instruction cache 34. As part of this operation, the UE recovery functionality 24 may decide it is appropriate to inspect neighboring address-instruction pairs in the emulated instruction cache 34 to determine whether there is a set of closely-placed UE instructions that should be emulated together as an emulation code block 42. If an emulation code block 42 is to be created, the unaffected instructions whose memory addresses are between the closely-placed UE instructions may be copied into the emulated instruction cache 34 from elsewhere in the memory 6 (or from the persistent storage 30). The new emulation code block 42 will thus include address-instruction pairs for a set of closely placed UE-affected instructions, together with address-instruction pairs for the intervening unaffected instructions. All address-instruction pairs of the emulation code block 42 may be arranged in sequential memory-address order for efficient execution.

The UE recovery functionality 24 may use any suitable criteria to determine when it is appropriate to create a new emulation code block 42. One criterion will be the amount of free memory available to increase the size of the emulated instruction cache 34. Insofar as emulation code blocks 42 include non-UE-affected instructions, their inclusion in the emulated instruction cache 34 will result in a cache memory footprint that is correspondingly larger than an emulated instruction cache without emulation code blocks. Knowing the amount of available memory may assist in determining a maximum permissible number of UE-affected instructions to be incorporated in the emulation code block 42, as well as a maximum permissible memory address separation between any two UE-affected instructions in the emulation code block.

Additional criteria for determining when it is appropriate to create a new emulation code block 42 may include an assessment of the cost of emulating all instructions in an emulation code block 42 versus the cost of emulating just the UE-affected instructions (together with the overhead of repeated transitions between MCI handling and original instruction stream execution). In an embodiment, the UE recover functionality 24 could maintain various statistics for all UE instances that occur during any given period of system uptime. The UE recovery functionality 24 could store information such as cost of execution, cost of emulation, etc. An emulation code block 42 may be created if the cost of block emulation is less than the cost of individual UE emulation (including associated MCI handling overhead) interspersed with in-line execution of unaffected instructions.

Accordingly, a technique has been disclosed for handling and recovering from uncorrected memory errors occurring inside a kernel text section.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A computer-implemented method for handling an uncorrected memory error (UE) inside a kernel text section, the method comprising:
   detecting a UE that affects a kernel text section stored in a memory that is operably coupled to a CPU executing kernel program instructions;
   identifying a current instruction affected by the UE;
   recovering the UE-affected instruction by loading a copy thereof into the memory from a kernel image maintained in persistent storage;
   emulating the UE-affected instruction using the copy of the UE-affected instruction;

incrementing an instruction pointer of the CPU to point to a next instruction in the memory that would normally be executed following the UE-affected instruction had there been no UE; and storing the copy of the UE-affected instruction in an emulated instruction cache in the memory for future lookup in response to another UE so that the UE-affected instruction can be subsequently recovered and emulated from the emulated instruction cache instead of the persistent storage.

2. The method of claim 1, wherein storing the copy of the UE-affected instruction is in association with storing an original memory address of the UE-affected instruction in an in-memory table as an address-instruction pair, the in-memory table forming the emulated instruction cache for future lookup in response to the other UE being at the same memory address, so that the UE-affected instruction can be subsequently recovered and emulated from the emulated instruction cache instead of persistent storage.

3. The method of claim 2, further including creating an emulation code block in the emulated instruction cache to handle multiple UE-affected instructions occurring proximate to each other in the memory.

4. The method of claim 3, wherein the emulation code block includes multiple closely-placed UE-affected instructions whose associated memory addresses are interspersed with memory addresses of unaffected instructions that are also included in the emulation code block.

5. The method of claim 4, wherein when a first instruction in the emulation code block is emulated from the emulated instruction cache, all remaining instructions in the emulation code block are emulated from the emulated instruction cache, thereby improving performance and reliability of kernel code blocks affected by multiple UEs.

6. The method of claim 1, wherein the recited operations are performed in interrupt context by a machine check interrupt handler in response to a machine check interrupt.

7. The method of claim 1, wherein the kernel text section is one of an operating system kernel text section or a hypervisor kernel text section.

8. A system, comprising:
a CPU;
a computer readable storage medium;
program instructions stored on the computer readable storage medium for execution by the CPU to perform operations for handling an uncorrected memory error (UE) inside a kernel text section, the operations comprising:
detecting a UE that affects a kernel text section stored in the memory, the CPU being operable to executes kernel program instructions from the memory;
identifying a current instruction affected by the UE;
recovering the UE-affected instruction by loading a copy thereof into the memory from a kernel image maintained in persistent storage;
emulating the UE-affected instruction using the copy of the UE-affected instruction;
incrementing an instruction pointer of the CPU to point to a next instruction in the memory that would normally be executed following the UE-affected instruction had there been no UE; and
storing the copy of the UE-affected instruction in an emulated instruction cache in the memory for future lookup in response to another UE so that the UE-affected instruction can be subsequently recovered and emulated from the emulated instruction cache instead of the persistent storage.

9. The system of claim 8, wherein storing the copy of the UE-affected instruction is in association with storing an original memory address of the UE-affected instruction in an in-memory table as an address-instruction pair, the in-memory table forming the emulated instruction cache for future lookup in response to the other UE being at the same memory address, so that the UE-affected instruction can be subsequently recovered and emulated from the emulated instruction cache instead of persistent storage.

10. The system of claim 9, wherein the operations further comprise creating an emulation code block in the emulated instruction cache to handle multiple UE-affected instructions occurring proximate to each other in the memory.

11. The system of claim 10, wherein the emulation code block includes multiple closely-placed UE-affected instructions whose associated memory addresses are interspersed with memory addresses of unaffected instructions that are also included in the emulation code block.

12. The system of claim 11, wherein when a first instruction in the emulation code block is emulated from the emulated instruction cache, all remaining instructions in the emulation code block are emulated from the emulated instruction cache, thereby improving performance and reliability of kernel code blocks affected by multiple UEs.

13. The system of claim 8, wherein the recited operations are performed in interrupt context by a machine check interrupt handler in response to a machine check interrupt.

14. The system of claim 8, wherein the kernel text section is one of an operating system kernel text section or a hypervisor kernel text section.

15. A computer program product, comprising:
a computer readable storage medium;
program instructions stored on the computer readable storage medium for execution by a CPU to perform operations for handling an uncorrected memory error (UE) inside a kernel text section, the operations comprising:
detecting a UE that affects a kernel text section stored in the memory, the CPU being operable to execute kernel program instructions from the memory;
identifying a current instruction affected by the UE;
recovering the UE-affected instruction by loading a copy thereof into the memory from a kernel image maintained in persistent storage;
emulating the UE-affected instruction using the copy of the UE-affected instruction;
incrementing an instruction pointer of the CPU to point to a next instruction in the memory that would normally be executed following the UE-affected instruction had there been no UE; and
storing the copy of the UE-affected instruction in an emulated instruction cache in the memory for future lookup in response to another UE so that the UE-affected instruction can be subsequently recovered and emulated from the emulated instruction cache instead of the persistent storage.

16. The computer program product of claim 15, wherein storing the copy of the UE-affected instruction is in association with storing an original memory address of the UE-affected instruction in an in-memory table as an address-instruction pair, the in-memory table forming the emulated instruction cache for future lookup in response to the other UE being at the same memory address, so that the UE-affected instruction can be subsequently recovered and emulated from the emulated instruction cache instead of persistent storage.

17. The computer program product of claim 16, wherein the operations further comprise creating an emulation code block in the emulated instruction cache to handle multiple UE-affected instructions occurring proximate to each other in the memory.

18. The computer program product of claim 17, wherein the emulation code block includes multiple closely-placed UE-affected instructions whose associated memory addresses are interspersed with memory addresses of unaffected instructions that are also included in the emulation code block.

19. The computer program product of claim 18, wherein when a first instruction in the emulation code block is emulated from the emulated instruction cache, all remaining instructions in the emulation code block are emulated from the emulated instruction cache, thereby improving performance and reliability of kernel code blocks affected by multiple UEs.

20. The computer program product of claim 15, wherein the recited operations are performed in interrupt context by a machine check interrupt handler in response to a machine check interrupt.

* * * * *